UNITED STATES PATENT OFFICE.

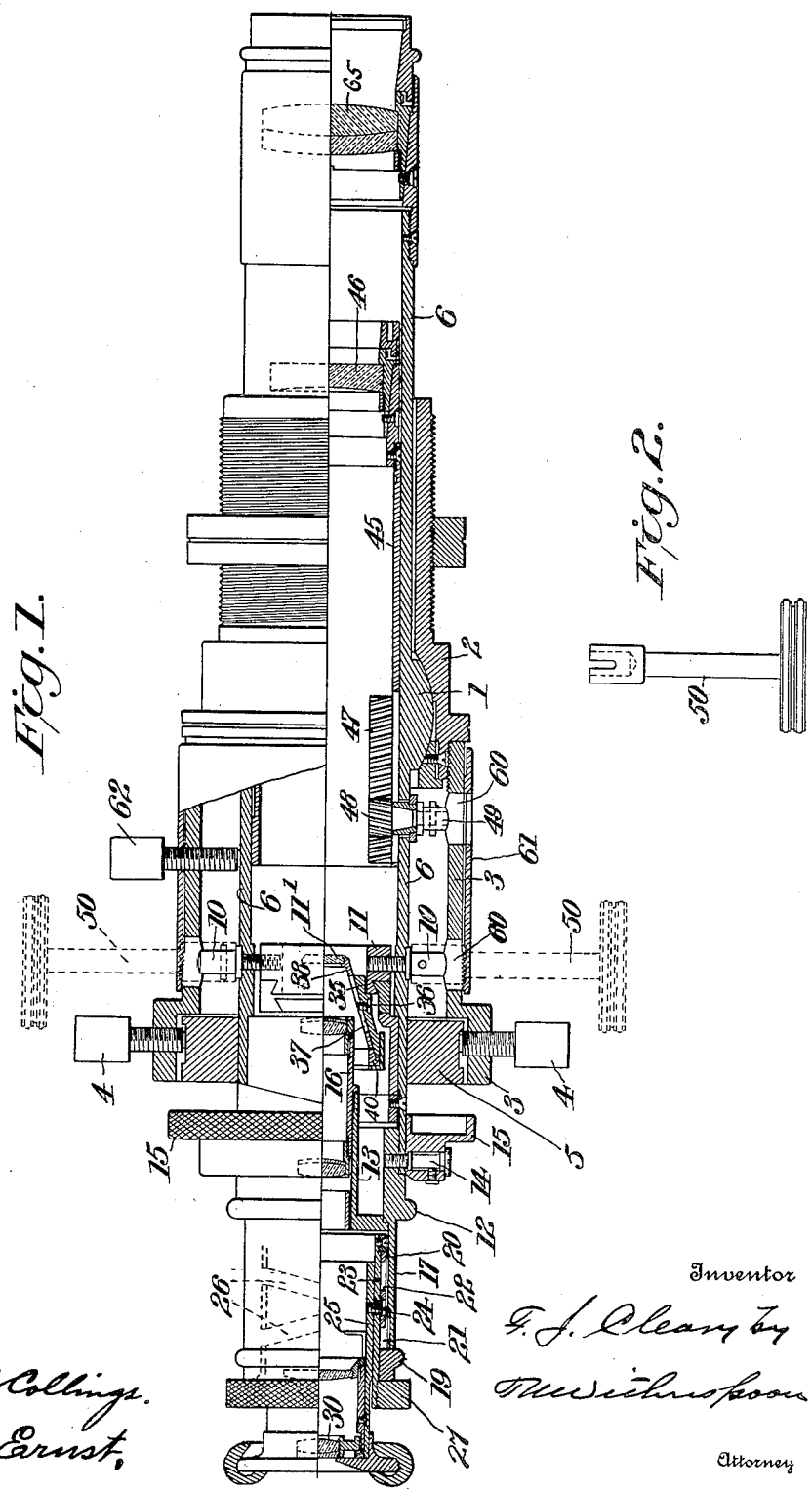

FRANCIS J. CLEARY, OF WASHINGTON, DISTRICT OF COLUMBIA.

BORE-SIGHTING TELESCOPE.

1,126,397.   Specification of Letters Patent.   Patented Jan. 26, 1915.

Application filed September 27, 1913. Serial No. 792,132.

*To all whom it may concern:*

Be it known that I, FRANCIS J. CLEARY, a citizen of the United States, residing at Washington, in the District of Columbia, have invented certain new and useful Improvements in Bore-Sighting Telescopes; and I do hereby declare the following to be a full, clear, and exact description of the invention, such as will enable others skilled in the art to which it appertains to make and use the same.

This invention relates to bore sighting telescopes and has for its object to make certain improvements in the telescope described and claimed in my copending application #761,965 filed April 18, 1913, entitled Bore sighting telescopes.

With these objects in view the invention consists in the novel details of construction and combinations of parts more fully hereinafter disclosed and particularly pointed out in the claims.

Referring to the accompanying drawings forming a part of this specification; Figure 1 is a side elevational view partly in section of a telescope made in accordance with my invention; and Fig. 2 is a view showing a means for turning the screws controlling the cross line slides.

Prior to my invention of the telescope disclosed in my said application above, it has been customary to place the cross line diaphragm in the center of the ball joint 1 and to insure that the cross line intersection was accurately placed in the line of collimation of the telescope during manufacture and during repairs, it was prior to my said invention, necessary to make the cross line diaphragm adjustable in a plane perpendicular to the axis of collimation. It was further necessary at times to remove the cross line diaphragm for cleaning; and, when this occurred at sea, for example, there were no facilities aboard ship for accurately centering it after it was replaced. Again, while the telescope could be rotated in the Y's on the cylindrical bearings near the ends of the telescope tube, provided for the purpose of this adjustment, yet, even if this could be done aboard ship, there was a great probability that, due to the necessarily rough handling or improper treatment that was sure to follow, these bearings themselves were almost sure to be found sooner or later out of alinement. In fact, out of the very great number of bore sight telescopes returned for repairs in our Navy, an examination has shown that the cross lines were incorrectly centered in say 90% of the telescopes. Now this fault, when it exists, causes the very serious error of the telescope's establishing, not the axis of the bore of the gun, but a line making an angle with it as will be obvious on reflection, and to this inaccurate line the line of collimation of the sight telescope itself is next made parallel, which results in a sighting error either in the horizontal plane, in the vertical plane, or in both planes. The seriousness of this error will be appreciated when it is said an error of one hundredth of an inch (0."01) in the position of the cross line intersection in the telescope causes a change of 17 feet in the position of the cross line intersection on a target distant 10000 yards. Another fault of the telescope in present use lies in the fact that it is in focus and without parallax only at distant ranges of 1600 yards or more, and the parallax is consequently serious when boresighting by means of battens at a near distance or when adjusting the telescope itself on the muzzle disk. This parallax can be partially overcome it is true, by fitting over the rear lens of the eye piece an opaque disk with a pin hole central aperture, but this greatly decreases the efficiency of the telescope because of the resulting loss of light. Another fault of the present telescope is due to the fact that while the eye piece tube is made adjustable so as to focus the telescope on objects at different distances, this adjustment cannot be successively used for this purpose as it is found that clamping and unclamping the eye piece or moving it in and out is apt to cause a change in the line of collimation. As a consequence, it has been found necessary to focus the present telescope on the object which is to be used in boresighting and then clamp the eye piece. The muzzle disk was then shipped in place and the telescope so directed that the cross line intersection intersected the central hole in the muzzle disk. But as the central hole in the muzzle disk was of necessity very much out of focus it would then appear, not as a small well defined hole in sharp focus, but as a large indistinct spot with a blurred (and sometimes irregular) outline, and this made the determination of the exact center of the central hole very uncertain. These faults were overcome in the telescope made the subject of my said copending application above, but it has now been found that still further improvements are desirable which will now be clear from the following.

2 indicates a housing having an enlarged rear end 3 through which passes the telescope adjusting screws 4, which take against recesses in the floating ring 5, slidingly fitting the telescope tube 6.

The ring 12 is rigid with the tube 17, and is secured to the telescope tube 6 by the screw 14, passing through the ring 15 fitting over said tubes 6 as shown. The tube 13 is assembled with tube 17 and carries the erecting system 16, and the tube 17 rigid with the ring 12 carries the ring 19 rigid with the tube 20, having a slot 21 into which fits the guide piece 22, through which and the tube 23 passes the screw 24 into the tube 25. The tube 23 is provided with a spiral groove 26 into which the screw 24 works, and is also provided with knurled ring 27 for turning tube 23 and thereby adjusting in and out the tube 25 and the eye piece 30 carried thereby.

The cross line diaphragm slides 11 are adjustable in directions at right angles to each other and to the axis of the telescope by means of the screws 10, only two of which are shown, but it is not in this invention adjustable longitudinally of said axis. In order that the cross lines may be readily removed for cleaning, and be replaced with exactness, I have in this invention provided the following means:—Fitting the glass diaphragm 11' is the cone shaped sleeve 38 which fits the cone shaped ring 35, carrying the screw 36, fitting the slot 37 in the cone shaped sleeve 38 carrying the said cross lines on the said glass diaphragm 11'. A locking ring 40 secures said lines and sleeve 38 in position in the ring 35.

45 represents a tube carrying the lens 46, and provided with the rack 47 engaged by the pinion 48 controlled by the stud 49 adapted to be engaged by the hand operated key 50.

60 represents holes through the housing 3 registering with the studs 49 and screws 10; and 61 a sleeve adapted to be turned to cover and uncover said holes, studs and screws.

62 represents a set screw for clamping the barrel 6 after it has been adjusted.

The operation and advantages of my improved bore sighting telescope will be clear when it is said that by providing the movable lens 46 between the objective 65 and cross line diaphragm 11', a large movement of said lens may be had in order to focus the image of a near object on the cross lines, therefore a very accurate focusing may be had in bore sighting guns when the object is only ten or twelve feet away, and the telescope is without parallax at such near distances. Further, it will be clear that owing to the cone fitting between the ring 35 and the sleeve 38 the cross lines may be removed for cleaning after being most accurately adjusted and replaced with the assurance that they will be in accurate adjustment after cleaning, which is a result not attainable in the old style telescopes. In order to remove these cross lines it is only necessary to release the ring 12 from the screw 14, remove said ring 12 together with the erecting system 16 and eye piece 30 as a unit, to then remove the locking ring 40 and finally slide the sleeve 38 out past the screw 36. To replace said cross lines, of course, the above operations are reversed. Again, in this improved form of my invention the cross lines being fixed against adjustment longitudinally of the telescope, they are not liable to become displaced owing to the wearing of the parts during long use as is the case with the present telescopes.

In the telescope made the subject of my application above, I have disclosed the practical necessity of being able to positively move the cross line diaphragm by manipulating simultaneously two oppositely disposed screws 10 and I provided thumb screws projecting beyond the barrel 6 for this purpose. In this invention, on the other hand, the screws 10 are covered by the sleeve 61, and detachable keys 50 may be fitted to said screws and simultaneously manipulated, thus securing all the advantages of my former invention as well as the additional advantage of covering said screws 10 by the sleeve 61.

The screw threads and ring on the outside of the housing 2 near its forward or objective end are for the purpose of securing the telescope in the bore of the gun as will be clear to those skilled in the art. The cone shape ring fittings for the lens 46 and objective 65 afford convenient means for removing and replacing these members after cleaning.

It is obvious that those skilled in the art may vary the details of my invention without departing from the spirit thereof and therefore I do not wish to be limited to the above disclosure except as may be required by the claims.

What I claim is:—

1. In a bore sighting telescope the combination with an objective; a cross line diaphragm fixed against longitudinal adjustment; means for adjusting said diaphragm transversely of the line of collimation; an adjusting lens located between said diaphragm and objective; and means for securing the telescope in the bore of a gun, substantially as described.

2. In a bore sighting telescope the combination with an objective; a cross line diaphragm fixed against longitudinal adjustment; means for adjusting said diaphragm transversely of the line of collimation; an adjusting lens located between said diaphragm and objective; removable means for carrying the cross lines associated with said diaphragm; and means for securing the telescope in the bore of a gun, substantially as described.

3. In a bore sighting telescope the combination with an objective; a cross line diaphragm member fixed against longitudinal adjustment; means for adjusting said diaphragm member transversely of the line of collimation; an adjustable lens located between said diaphragm member and said objective; a ring fitting said diaphragm member; a removable sleeve carrying the cross lines fitting said ring; and means for securing the telescope in the bore of a gun, substantially as described.

4. In a bore sighting telescope the combination with an objective; a cross line diaphragm fixed against longitudinal adjustment; means for adjusting said diaphragm transversely of the line of collimation; an adjusting lens located between said diaphragm and objective; readily removable cone shaped means associated with said diaphragm for carrying the cross lines; locking means for holding said cone shaped means in place; and means for securing the telescope in the bore of a gun, substantially as described.

5. In a bore sighting telescope the combination of a cross line diaphragm member fixed against longitudinal adjustment; removable means carrying the cross lines, associated with said diaphragm member; an objective, a lens located between said diaphragm member and objective; means comprising a pinion associated with a key engaging head for adjusting said lens; oppositely disposed screws entering said diaphragm member said screws provided with heads and adapted to positively adjust said diaphragm member in opposite directions; detachable keys adapted to engage said screw heads for simultaneously adjusting the screws and pinion; and means for covering said screw heads when said keys are detached therefrom, substantially as described.

6. In a bore sighting telescope the combination of an objective; a transversely adjustable cross line diaphragm fixed against longitudinal movement; readily detachable means carrying cross lines supported on said diaphragm; a lens located between said objective and diaphragm; means for adjusting said lens; an eye piece; and means for adjusting said eye piece, substantially as described.

7. In a bore sighting telescope the combination of an objective; a transversely adjustable cross line diaphragm fixed against longitudinal movement; readily detachable means carrying cross lines supported on said diaphragm; a lens located between said objective and diaphragm; means for adjusting said lens; an eye piece; an erecting system associated with said eye piece; and means for adjusting said eye piece, substantially as described.

8. In a bore sighting telescope the combination of an objective; a tube carrying said objective; a floating ring surrounding said tube in which said tube may rotate on its axis; and means for securing said tube and objective in the bore of the gun, substantially as described.

9. In a bore sighting telescope the combination of an objective; a tube carrying said objective; a floating ring surrounding said tube in which said tube may rotate on its axis; means for adjusting said ring transversely of the axis of the tube; and means for securing said tube and objective in the bore of the gun, substantially as described.

10. In a bore sighting telescope, the combination of an objective; a tube carrying said objective; a floating ring surrounding said tube, and in which said tube may rotate on its axis; a cross line diaphragm fixed against longitudinal adjustment; and means for securing said telescope in the bore of the gun, substantially as described.

11. In a bore sighting telescope, the combination of an objective; a tube carrying said objective; a floating ring surrounding said tube, and in which said tube may rotate on its axis; means for adjusting said floating ring transversely of the axis of the tube; a cross line diaphragm fixed against longitudinal adjustment; and means for securing said telescope in the bore of the gun, substantially as described.

12. In a bore sighting telescope, the combination of an objective; a tube carrying said objective; a floating ring surrounding said tube, and in which said tube may rotate on its axis; a cross line diaphragm fixed against longitudinal adjustment; an adjustable lens located between said diaphragm and objective; and means for securing said telescope in the bore of the gun, substantially as described.

13. In a bore sighting telescope, the combination of an objective; a tube carrying said objective; a floating ring surrounding said tube, and in which said tube may rotate on its axis; means for adjusting said floating ring transversely of the axis of the tube; a cross line diaphragm fixed against longitudinal adjustment; an adjustable lens located between said diaphragm and objective; and means for securing said telescope in the bore of the gun, substantially as described.

In testimony whereof I affix my signature, in presence of two witnesses.

FRANCIS J. CLEARY.

Witnesses:
 KINQUERD ROBINS,
 R. A. SHERWOOD.

Copies of this patent may be obtained for five cents each, by addressing the "Commissioner of Patents, Washington, D. C."